(12) United States Patent
Kobayashi et al.

(10) Patent No.: US 7,071,986 B2
(45) Date of Patent: Jul. 4, 2006

(54) DIGITAL CAMERA UTILIZING ILLUMINATION FROM A FLASH LIGHT FOR FOCUS DETECTION AND CONTROL

(75) Inventors: Yoshiharu Kobayashi, Sakai (JP); Kazuhiko Yukawa, deceased, late of Sakai (JP); by Kazumi Yukawa, legal representative, Sakai (JP); Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 929 days.

(21) Appl. No.: 09/874,702

(22) Filed: Jun. 5, 2001

(65) Prior Publication Data

US 2001/0050719 A1    Dec. 13, 2001

(30) Foreign Application Priority Data

Jun. 9, 2000    (JP) .............................. 2000-173575

(51) Int. Cl.
H04N 5/232 (2006.01)
H04N 5/222 (2006.01)
G03B 3/00 (2006.01)
H04N 5/235 (2006.01)

(52) U.S. Cl. ...................... 348/353; 348/371; 348/354; 396/89

(58) Field of Classification Search ........ 348/370–372, 348/353, 345–356, 222.1
See application file for complete search history.

(56) References Cited

U.S. PATENT DOCUMENTS

| 4,760,418 | A | * | 7/1988 | Ishizaki et al. | 396/157 |
| 5,448,331 | A | * | 9/1995 | Hamada et al. | 396/106 |
| 6,271,883 | B1 | * | 8/2001 | Iijima et al. | 348/345 |
| 6,498,900 | B1 | * | 12/2002 | Nakata et al. | 396/108 |
| 6,700,614 | B1 | * | 3/2004 | Hata | 348/354 |

FOREIGN PATENT DOCUMENTS

| JP | 6-90397 A | 3/1994 |
| JP | 6-225206 A | 8/1994 |
| JP | 08-334682 | * 12/1996 |
| JP | 08-334682 A | 12/1996 |
| JP | 10-197784 A | 7/1998 |

OTHER PUBLICATIONS

Japanese "Notification of Reason(s) for Refusal" dated Apr. 8, 2003 for counterpart Japanese Patent Application No. 2000-173575, along with an English-language translation thereof.

* cited by examiner

Primary Examiner—David Ometz
Assistant Examiner—Nhan T. Tran
(74) Attorney, Agent, or Firm—Sidley Austin LLP (57) ABSTRACT

Flash emission is required when image data have a low luminance value and when it is determined that flash emission is not prohibited, the built-in flash is used for autofocus (AF). An AF evaluation value is obtained under the flash emission, and the lens is driven based on this value. This operation is repeated until it is determined that the lens is focused, and accurate AF is executed even in dark conditions.

8 Claims, 7 Drawing Sheets

AF evaluation value $Xn = \Sigma |\Delta ij|$   $(\Delta ij = X_{i+1,j} - X_{i,j})$

DIGITAL CAMERA UTILIZING ILLUMINATION FROM A FLASH LIGHT FOR FOCUS DETECTION AND CONTROL

This application is based on Patent Application Ser. No. 2000-173575 filed in Japan, the content of which is hereby incorporated by reference.

BACKGROUND OF THE INVENTION

1. Field of the Invention

The present invention relates to a digital camera for generating image data of an object by an image sensing element.

2. Description of the Related Art

Conventionally, in cameras using silver halide film (hereinafter referred to as "silver halide cameras"), light emitted from a flash built into the camera body or from an external flash is used as auxiliary light for autofocusing (AF) when the photographic object has low luminance or the object has low contrast (e.g., refer to U.S. Pat. No. 5,448,331).

On the other hand, recent years have seen the rapidly popularity of digital cameras which convert, process, and record an optical image as image information using an image sensing element in conjunction with progress in image sensing elements and the development of the computer environment. In addition, the number of pixel of the image sensing element has reached the order of several millions of pixels due to the demand for high quality images. The size of the image sensing element cannot be very large due to the relationship to mass production yield. For this reason the pixel pitch is becoming increasingly smaller, and the distance measuring accuracy demanded in a digital camera is not of the proportion of the silver halide camera.

In a conventional silver halide camera, distance measurement is normally accomplished using a distance measuring sensor. However, in a digital camera using a high-pixel CCD having a small pixel pitch, the distance measuring sensor used in the silver halide camera cannot be used directly due to the distance measuring accuracy.

In digital cameras of recent years, a so-called contrast type AF mechanism has been used to detect the contrast of image data from the image sensing element used to obtain the recording image, and move the lens to the focus position based on this contrast detection.

Even when an image sensing element is used for recording, however, distance measurement may be impossible when the object to be measured has low luminance or low contrast. Furthermore, digital cameras have conventionally accomplished autofocusing using a light projection means separate from the internal flash, i.e., a so-called auxiliary lighting device, as disclosed in Japanese Laid-Open Patent No. H8-334682.

The auxiliary lighting device disclosed in Japanese Laid-Open Patent No. H8-334682, however, is a light projection device separate from the internal flash. Such an arrangement increases the number of parts, and therefore increases the cost of the product. Additionally, since the internal flash is not used during autofocusing in the art disclosed in Japanese Laid-Open Patent No. H8-334682, the autofocus control is not performed so as consider the relationship of the flash emission during photography.

In view of the aforesaid disadvantages of the conventional art, an object of the present invention is to provide a digital camera capable of controlling autofocus while considering flash emission during photography as well as restraining production cost.

SUMMARY OF THE INVENTION

These objects are attained by the digital camera of the present invention comprising an image sensing element for generating image data of an object; a light emission device for emitting the light to illuminate the object during photography; a first detector for detecting the contrast of the image data; a lens driver for driving the lens based on the contrast detected by the first detector; a second detector for detecting the luminance of the image data; a light emission controller for executing the light emission of the light emission device to detect the contrast when the luminance detected by the second detector is less than a specific value; a power source for supplying an electrical power to the light emission device and being chargeable; and a lens drive controller for inhibiting the driving of the lens by the lens driver during charging of the power source.

These objects are further attained by another digital camera of the present invention comprising an image sensing element for generating image data of an object; a light emission device for emitting the light to illuminate the object during photography; a first detector for detecting the contrast of the image data; a lens driver for driving the lens based on the contrast detected by the first detector; a second detector for detecting the luminance of the image data; a light emission controller for executing the light emission of the light emission device to detect the contrast when the luminance detected by the second detector is less than a specific value; and a gain controller for increasing the gain when the first detector detects the contrast under the light emission by the light emission device.

These objects are further attained by another digital camera of the present invention comprising an image sensing element for generating image data of an object; a light emission device for emitting the light to illuminate the object during photography; a first detector for detecting the contrast of the image data; a lens driver for driving the lens based on the contrast detected by the first detector; a second detector for detecting the luminance of the image data; a setter for setting the prohibition of the light emission by the light emission device; and a light emission controller for prohibiting the light emission during detection of the contrast when prohibition of flash emission has been set by the setter, and for executing the light emission of the light emission device to detect the contrast when the luminance detected by the second detector is less than a specific value and when the prohibition of flash emission has not been set.

These objects are further attained by another digital camera of the present invention comprising an image sensing element for generating image data of an object; a light emission device for emitting the light to illuminate the object during photography; a first detector for detecting the contrast of the image data; a lens driver for driving the lens based on the contrast detected by the first detector; a second detector for detecting the luminance of the image data; a light emission controller for executing the light emission of the light emission device to detect the contrast when the luminance detected by the second detector is less than a specific value; a power source for supplying an electrical power to the light emission device and being chargeable; and a discriminator for discriminating whether or not the lens is focused based on the contrast obtained by the first detector in parallel with the charging of the power source.

These objects are further attained by another digital camera of the present invention comprising an image sensing element for generating image data of an object; a light emission device for emitting the light to illuminate the object during photography; a first detector for detecting the contrast of the image data; a lens driver for driving the lens based on the contrast detected by the first detector; a second detector for detecting the luminance of the image data; a light emission controller for executing the light emission of the light emission device to detect the contrast when the luminance detected by the second detector is less than a specific value; and a light adjuster for adjusting the amount of light emission by the light emission device during photography, and for prohibiting adjustment of the amount of light emission of the light emission device when the contrast is detected.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the present invention are described hereinafter with reference to the accompanying drawings.

1. General Structure

FIGS. 1 through 4 respectively show a front view, back view, side view, and bottom view of a digital camera 1 of an embodiment of the present invention. FIG. 5 is a block diagram showing the internal structure of the digital camera 1.

Figure 1:
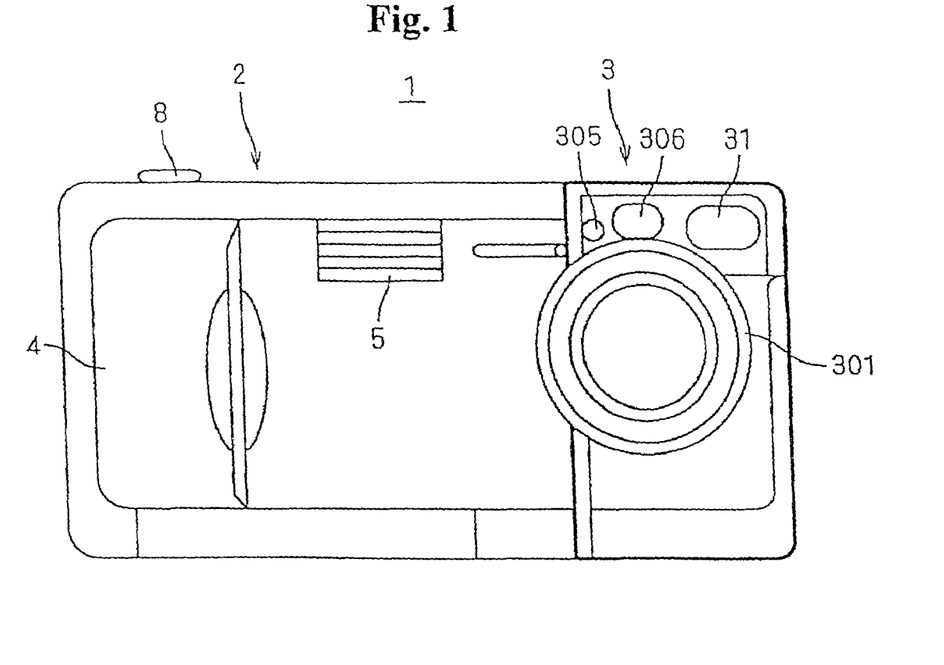
FIG. 1 is a front view of a digital camera of an embodiment of the present invention.

The digital camera 1 comprises a box-like camera body 2, and a rectangular image sensing unit 3 (indicated by the thick lines in FIGS. 1, 2, and 4) as shown in FIG. 1. The image sensing unit 3 has a macro function zoom lens 301 acting as a taking lens, and is provided with an image sensing circuit 302 having a CCD 303 (refer to FIG. 5) acting as a ½ inch size CCD color area sensor disposed at a suitable position behind the zoom lens 301.

A light adjusting control circuit 304 having a light adjusting control sensor 305 for receiving the reflected light of the flash from the photographic object is provided at a suitable location within the image sensing unit 3 similar to a camera using silver halide film. In addition, an optical finder 31 is provided at suitable locations within the image sensing unit 3.

On the front surface of the camera body 2 is provided a grip 4 on the left end and a built-in flash 5 on the top center, and a shutter button 8 is provided on the top surface, as shown in FIG. 1.

Figure 2:
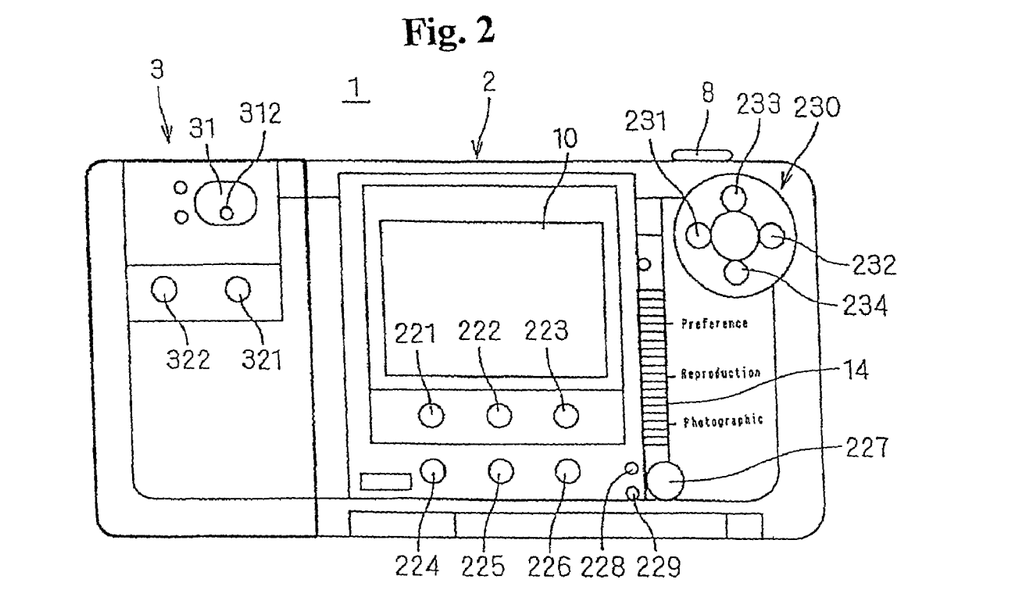
FIG. 2 is a back view of a digital camera of an embodiment of the present invention.

On the back surface of the camera body 2 is provided an LCD 10 as a photographic image monitor display (equivalent to a viewfinder), and for displaying the recorded images at the approximate center of the back surface as shown in FIG. 2. The LCD 10 is equivalent to an electronic viewfinder. Below the LCD 10 are provided key switches 221–226 for operating the digital camera 1, and a power switch 227. The flash exposure mode can be selected by pressing the key switch 222. Specifically, automatic flash emission mode, force flash emission mode, and flash prohibition mode are sequentially selected by pressing the key switch 222 a number of times.

On the left side of the power switch 227 are arranged an LED 228 which lights when the power is ON, and an LED 229 which displays while a memory card is being accessed.

Also on the back surface of the camera body 2 is a mode setting switch 14 for selecting among [photographic mode], [reproduction mode], and [preference mode] (refer to FIG. 2). The photographic mode is used for taking photographs. The reproduction mode is a mode for reproducing a photographed image recorded on a memory card and displaying the image on the LCD 10. The preference mode is a mode for settings of various types by selecting a desired item from among display items (setting items). The operations in each mode are described later.

The mode setting switch 14 is a contact point slide switch and sets the photographic mode when at the bottom, sets the reproduction mode at the center, and sets the preference mode at the top, as shown in FIG. 2.

A 4-point switch 230 is provided on the right side of the back surface of the camera. In the photographic mode, a zoom motor 307 (refer to FIG. 5) drives the zoom lens 301 for zooming by pressing the buttons 231 and 232. The zoom lens 301 is driven to the wide side when button 231 is pressed, and driven to the telecentric side when the button 232 is pressed.

The execution of autofocus in the digital camera 1 is described layer, but manual focusing is accomplished by user operation to drive an AF motor 308 via a general controller 211 through an AF motor drive circuit 216 when buttons 233 and 234 are pressed, so as to move the zoom lens 301.

On the back of the image sensing unit 3 are provided an LCD button 321 for turning ON and OFF the LCD 10, and a macro button 322. When the LCD button 321 is pressed, the LCD display is switched ON or OFF. For example, during photography using only the optical finder 31, the LCD display is switched OFF to conserve power. When the macro button 322 is pressed during macro photography, an AF motor 308 (refer to FIG. 5) is driven to place the zoom lens 301 in the macro photography enabled state.

Figure 3:
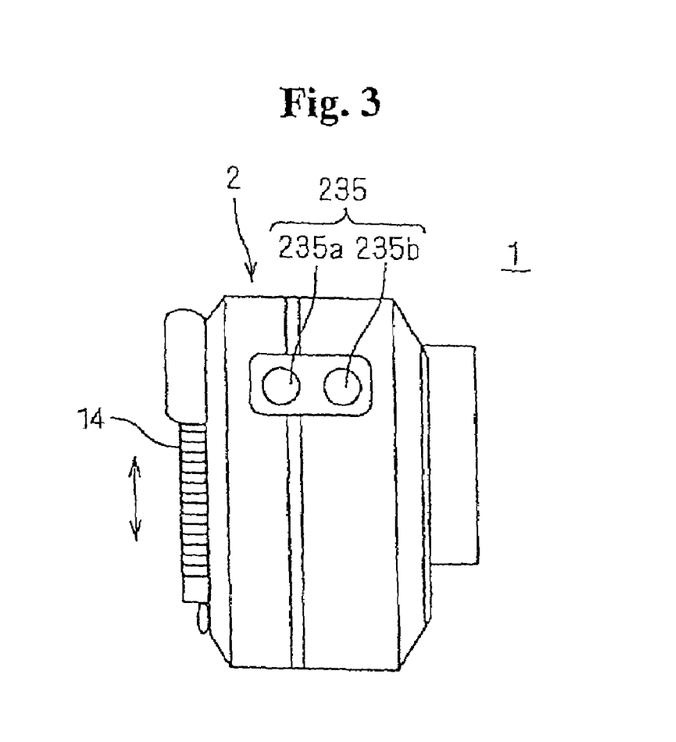
FIG. 3 is a side view of a digital camera of an embodiment of the present invention.

On the side of the camera body 2 is provided a pin unit 235, as shown in FIG. 3. The pin unit 235 is provided with a DC input pin 235a, and a video-out pin 235b for outputting the content displayed on the LCD 10 to an external video monitor.

Figure 4:
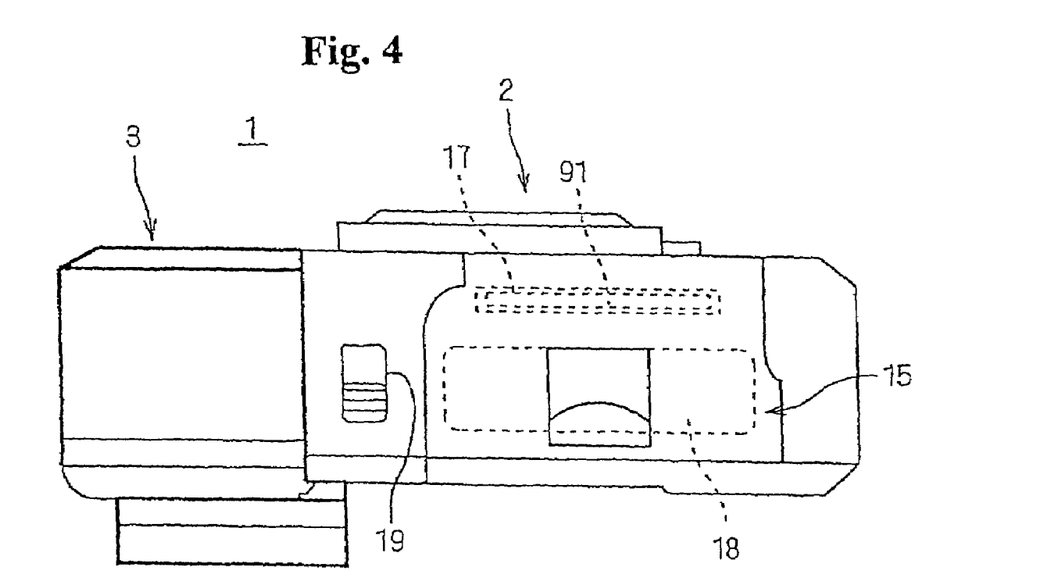
FIG. 4 is a bottom view of a digital camera of an embodiment of the present invention.
Figure 5:
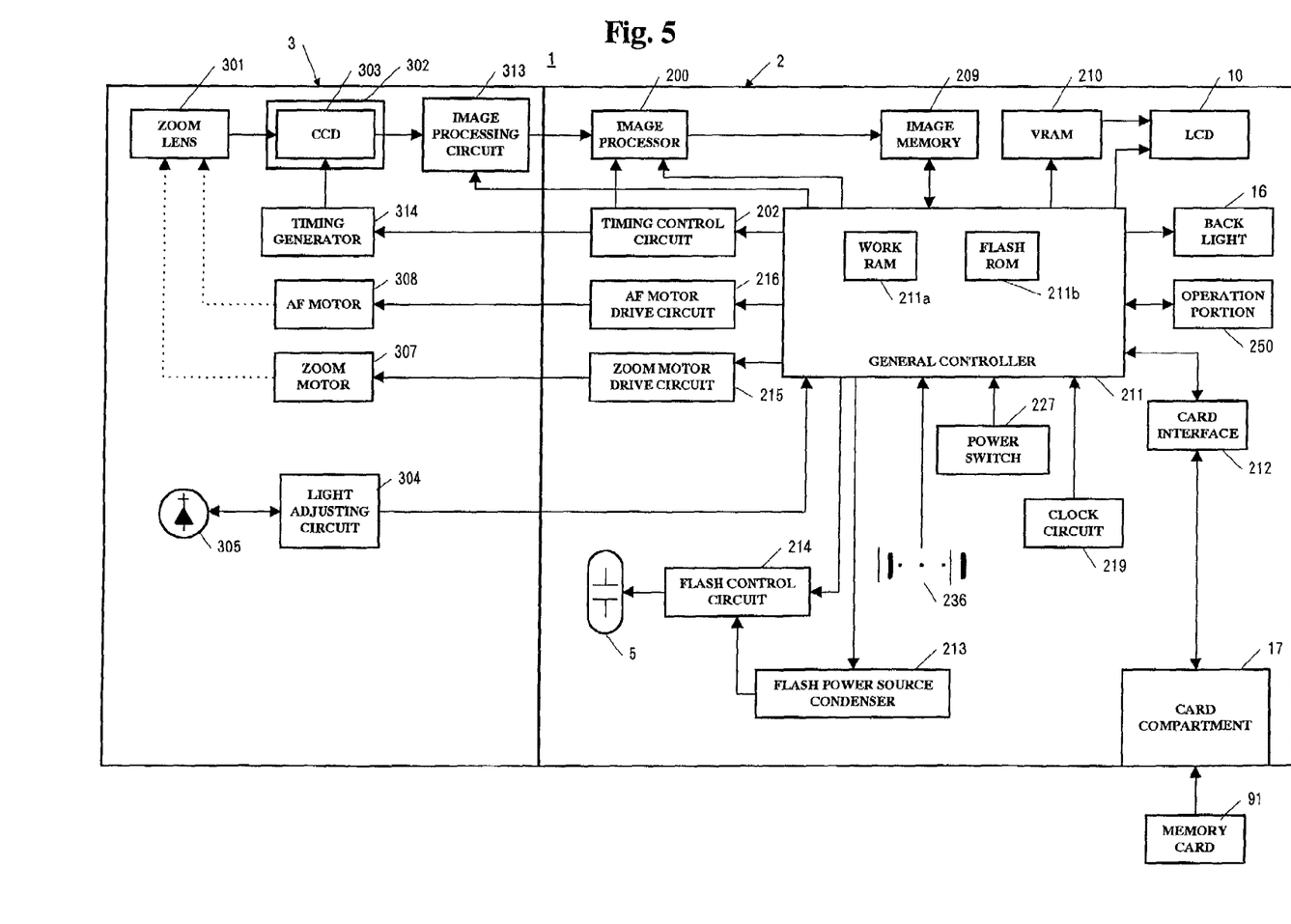
FIG. 5 is a block diagram showing the internal structure of the digital camera of an embodiment of the present invention.

On the bottom surface of the camera body 2 are provided a battery compartment 18 for loading a battery, and a card compartment 17, as shown in FIG. 4. The card compartment 17 has a slot-shaped insertion opening used for inserting a memory card 91 within the camera body 2 to allow writing and reading of image data to/from the memory card 91. Both compartments can be opened and closed using a clam-shell type door. FIG. 4 shows an example with a memory card 91 installed in the card compartment 17.

In the digital camera 1, four AA-size dry cell batteries are installed in the battery compartment 18, and connected in series as to form the power source battery 236 (refer to FIG. 5) which is used as the drive source. Of course, electric power also may be supplied from an adapter using the DC input pin 235a shown in FIG. 4.

The bottom surface is also provided with release lever 19 for releasing the connection between the image sensing unit 3 and the camera body 2 which are connected by a connector and key-like connecting member.

The internal structure of the image sensing unit 3 is described below with reference to FIG. 5.

The image sensing circuit 302 photoelectrically converts an optical image of the photographic object formed on the CCD 303 by the zoom lens 301 using the CCD 303, and outputs the image as red (R), green (G), blue (B) color component image signals (signals comprising a signal series of pixel signals of the light received by each pixel).

Since the diaphragm is fixed in the digital camera 1, exposure control in the image sensing unit 3 is accomplished by regulating the amount of exposure light of the CCD 303 (i.e., the load accumulation time of the CCD 303 corresponding to shutter speed). When a suitable shutter speed cannot be set when the photographic object luminance is a low luminance, unsuitable exposure due to insufficient exposure light can be corrected by adjusting the level of the image signal output from the CCD 303. That is, during times of low luminance, exposure can be controlled by combining shutter speed and gain adjustment. The image signal level adjustment is accomplished by the auto gain control circuit (AGC) within a signal processing circuit 313 described later.

A timing generator 314 generates a drive control signal for the CCD 303 based on a clock signal transmitted from a timing control circuit 202 within the camera body 2. The timing generator 314 generates clock signals, for example, such as a storage start/end timing signal (i.e., exposure start/end), read control signal (horizontal synchronization signal, vertical synchronization signal, transfer signal and the like) of each pixel photoreception signal and the like, and outputs these signals to the CCD 303.

The signal processing circuit 313 performs specific analog signal processing of image signals (analog signals) output from the image sensing circuit 302. The signal processing circuit 313 includes a correlation double sampling (CDS) circuit and an auto gain control (AGC) circuit, and reduces the noise of the image signals via the CDS circuit, and adjusts the level of the image signals by adjusting the gain via the AGC circuit.

The light adjusting control circuit 304 controls the amount of light emitted by the built-in flash 5 during flash photography to the specific amount of light emission set by the general controller 211 of the camera body 2. When the amount of received light attains the specific amount of emission light, a flash stop signal is output from the light adjusting control circuit 304 to the flash control circuit 214 via the general controller 211. The flash control circuit 214 forcibly stops light emission by the built-in flash 5 in response to the emission stop signal, and in this way the amount of light emitted from the flash 5 is controlled to the specific emission amount.

Within the image sensing unit 3 are provided a zoom motor 307 for moving the lens between a housed position and photography position and for changing the zoom ratio of the zoom lens 301, and an autofocus (AF) motor 308 for focus adjustment.

The internal structure of the camera body 2 is described below.

The general controller 211 mainly comprises a CPU, and controls each peripheral structure of the camera body 2 and the interior of the image sensing unit 3 connected by address bus, data bus, and control bus, and performs general control of photographic operations of the digital camera 1.

The flow of the image data in FIG. 5 (and FIG. 6 described later) is indicated by arrows between the peripheral structures, but actually the image data are transmitted to each peripheral structure through the general controller 211. For this reason within the general controller 211 are provided a DRAM work RAM 211a and a flash ROM 211b for storing control programs.

Image signal processing within the camera body 2 and structures relating to image display are described below.

Figure 6:
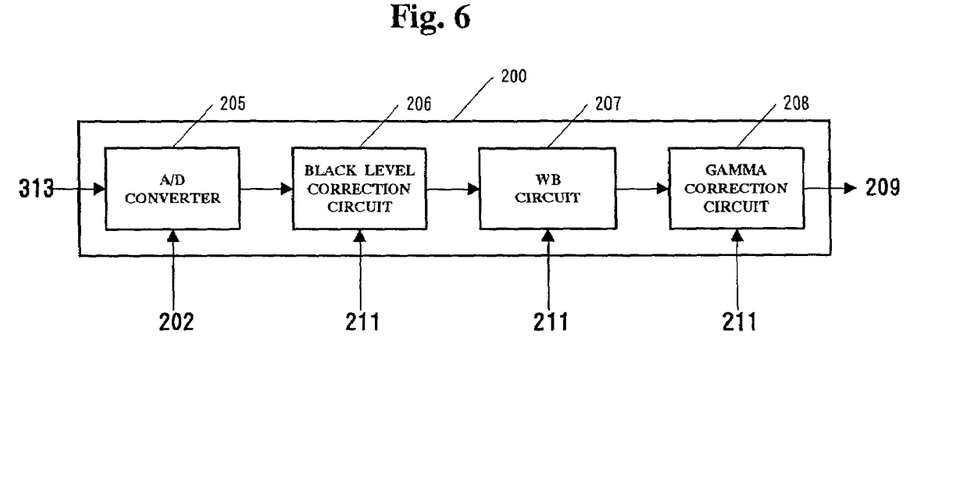
FIG. 6 is a block diagram showing the structure of the image processor.

Analog image signals transmitted from the signal processing circuit 313 of the image sensing unit 3 are subjected to various image processing in the image processor 200 within the camera body 2. FIG. 6 is a block diagram showing the structure of the image processor 200. First, the analog image signal transmitted to the image processor 200 is converted to a 10-bit digital signal for each pixel in the A/D converter 205. The A/D converter 205 converts each pixel signal (analog signal) to a 10-bit digital signal based on the clock signal of the A/D converter input from the timing control circuit 202.

The timing control circuit 202 generates a standard clock signal, and clock signals for the timing generator 314 and A/D converter 205 via control by the general controller 211.

A black level correction circuit 206 corrects the black level the A/D converted pixel signal (hereinafter referred to as "pixel data") to a standard black level. A WB circuit 207 performs level conversion of the pixel data of each color component R, G, B, and adjusts the white balance in consideration of gamma correction in a later process. The white balance adjustment is accomplished using a level conversion table (properly speaking, the data of the table) input from the general controller 211 to the WB circuit, and the conversion coefficient (characteristics slope) of each color component of the level conversion table is set for each photographic image by the general controller 211.

A gamma correction circuit 208 corrects the gamma characteristic of the pixel data. The output from the gamma correction circuit 208 is transmitted to an image memory 209 as shown in FIG. 5.

The image memory 209 is a memory for storing pixel data output from the image processor 200, and has a 1-frame memory capacity. That is, the image memory 209 has a memory capacity sufficient to store pixel data of n×m pixels when the CCD 303 has pixels arrayed in a matrix of n lines and m columns (where n and m are natural numbers), and stores the pixel data in a corresponding memory area (address).

A VRAM 210 is a buffer memory for image data reproduced and displayed on the LCD 10. The VRAM 210 has a memory capacity sufficient to store image data corresponding to the number of pixels of the LCD 10.

According to this construction, in the photographic standby state of the photography mode, when the LCD button 321 sets the LCD display ON, pixel data of the image sensed for each specific interval by the image sensing section 3 are processed by the image processor 200, and stored in the image memory 209. The image data stored in the image memory 209 are then transferred through the general controller 211 to the VRAM 210, and display on the LCD 10 (live view display). In this way the photographer is able to verify the object image by the image display on the LCD 10.

In the reproduction mode, after the image read from the memory card 91 has been subjected to specific signal processing by the general controller 211, the data are transmitted to the VRAM 210 and reproduced and displayed on the LCD 10. When an image is displayed on the LCD 10, a backlight 16 is lighted via control by the general controller 211.

Another structure within the camera body 2 is described below.

A card I/F 212 is an interface for bi-directional communication with various types of memory cards installed in the card compartment 17. Specifically, writing image data to the memory card 91, and reading image data from the memory card 91.

A flash control circuit 214 is a circuit for controlling the emission of the built-in flash 5. A flash power source condenser 213 is connected to the flash control circuit 214, and the flash control circuit 214 controls the emission or lack thereof, emission amount, and emission timing of the built-in flash 5 by controlling (described later) the power supplied to the built-in flash 5 based on control signals from the general controller 211. Furthermore, flash control circuit 214 controls the amount of emission of the built-in flash 5 based on an emission stop signal input from the light adjusting control circuit 304. The general controller 211 supplies power from the power source battery 236 to recharge the flash power source condenser 213 as necessary.

A clock circuit 219 manages the photograph date and time, and is driven by a separate battery not shown in the drawings.

Within the camera body 2 are provided a zoom motor drive circuit 215 and AF motor drive circuit 216 for driving the zoom motor 307 and the AF motor 308. These circuits function by the operation of an operating portion 250 of a shutter button 8 and various other types of switches and buttons described later.

For example, the shutter button 8 is a two-stage switch capable of detecting the half-depression state, and full-depression state used by cameras using silver halide camera. When the shutter button 8 is depressed half way in the photography standby state, the general controller 211 calculates an AF evaluation value from the image data stored in the image memory as described later, and the AF motor drive circuit 216 drives the AF motor 308 in accordance with the specification of the general controller 211 based on the evaluation value so as to move the zoom lens 301 to a focus position and accomplish autofocusing.

When buttons 231 and 232 are pressed, the signal from the buttons is transmitted to the general controller 211, and the zoom motor drive circuit 215 drives the zoom motor 307 in accordance with the specification of the general controller 211 so as to move the zoom lens 301 for zooming.

Although the various structures within the camera body 2 have been described above, the general controller 211 accomplishes various other functions such as timing control and transfer of data with peripheral structures through software.

For example, the general controller 211 is provided with a luminance detection and determining function and a shutter speed setting function for setting the exposure control value (shutter speed). In the photographic standby state, the luminance detection and determining function detect and determine the brightness of an object using image data stored in the image memory 209 captured every ⅓₀ sec by the CCD 303. The specific method of luminance detection totals or averages the luminance value of each color component R, G, B of the image data for the entire image. The shutter speed setting function sets the shutter speed (integral time of the CCD 303) based on the determination result of the object brightness determined by the luminance determination.

The general controller 211 is provided with a filtering process function, recorded image generation function, and reproduction image generation function to accomplish the photographic image recording process.

The filtering process function corrects the high frequency component of the image being recorded via a digital filter to correct image quality relating to contour.

The recording image generation function reads the pixel data from the image memory 209, and generates a thumbnail image and compressed image to be recorded on the memory card 91. Specifically, pixel data are read for each 8 pixels in both horizontal and vertical directions while scanning from the image memory 209 in the raster scan direction. Next, a thumbnail image is generated and transferred to the memory card 91 and recorded on the memory card 91. When recording the compressed image data on the memory card 91, all pixel data are read from the image memory 209, subjected a specific compression processing by a JPEG method such as Hoffman coding or two-dimensional DCT conversion, and recorded on the memory card 91.

The specific operation is described below. When a photograph is specified by the shutter button 8 in the photography mode, a thumbnail image of the image in the image memory 209 is generated, and a compressed image compressed by a JPEG method is generated based on the set compression ratio, and both images together with tag information relating to the photographed image (information such as frame number, exposure value, shutter speed, compression ratio, date, time, flash ON/OFF data, scene information, image determination result and the like) are recorded on the memory card 91.

The reproduction image generation function generates a reproduced image by expanding the compressed image recorded on the memory card 91. The specific operation is described below. When the mode setting switch 14 sets the reproduction mode, the image data of the highest frame number in the memory card 91 are read and expanded, and transferred to the VRAM 210. In this way the image of the highest frame number, i.e., the latest photographed image, is displayed on the LCD 10.

As shown in FIG. 5, when a memory card 91 is loaded and the digital camera 1 executes the photography process and regeneration process, the control of each section is executed by the general controller 211, but the control programs for executing these controls are installed beforehand n a flash ROM 211b within the general controller 211.

2. Controls Relating to Photography

Details of the AF method in the digital camera 1 of the present embodiment are described below. The digital camera 1 executes autofocusing by a contrast AF method, which focuses by determining an approximate value of the contrast of all image data by the general controller 211, and moving the zoom lens 301 accordingly.

Figure 7:
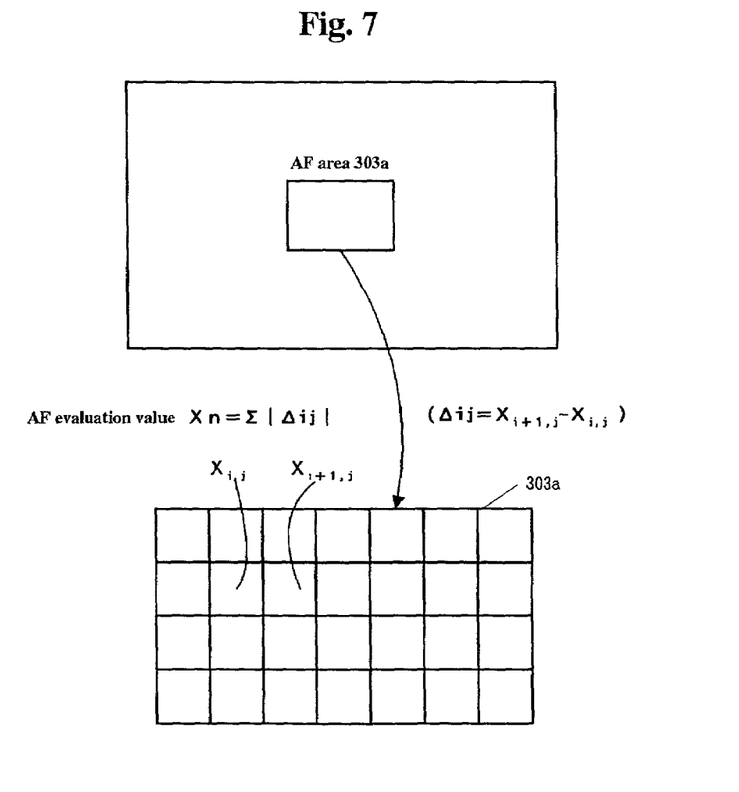
FIG. 7 shows the calculation of the AF evaluation value.

The calculation of the AF evaluation value is described below. FIG. 7 shows the mode of calculation of the AF evaluation value. The general controller 211 reads partial image data only of a square region AF area 303a at the center of the image from among the image data obtained by the CCD 303 and recorded in the image memory 209, and determines the AF evaluation value Xn as described below.

Each pixel value of the partial image data is represented as $X_{i,j}$ (where i and j are indices if each pixel specifying the line and column direction; and i and j specify each pixel within the partial image by being respectively different). When the differential value Δij is expressed as $\Delta ij = X_{i+1,j} - X_{i,j}$, the AF evaluation value Xn is determined by the following equation.

$$Xn = \Sigma |\Delta ij|$$

Σ represents the sum of the indices i and j which represent all pixels within the AF area 303a. That is, the AF evaluation value Xn represents the contrast of the partial image (accordingly, it is an approximate contrast value of the image data of the entire image recorded in image memory 209).

Figure 8:
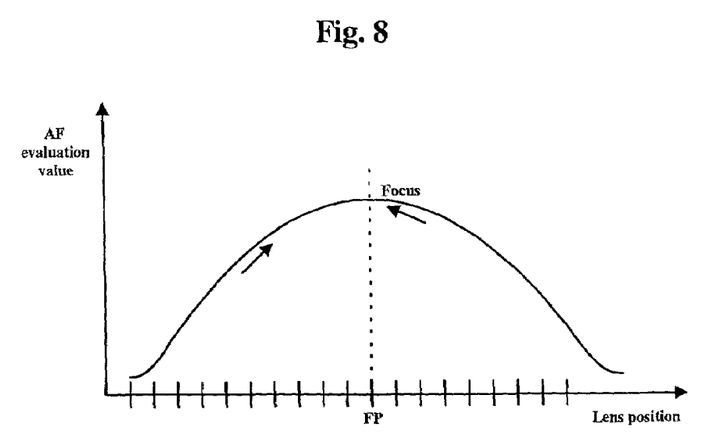
FIG. 8 shows the focus determination by the AF evaluation value.

FIG. 8 shows the mode of focus determination using the AF evaluation value. The horizontal direction in FIG. 8 represents the lens position of the zoom lens 301 and the maximum position of the AF evaluation value is the focus position FP. When the lens position moves in the direction of increasing AF evaluation value in specific steps (single steps in this embodiment), the zoom lens 301 soon passes the focus position, and the AF evaluation value starts to decrease as movement continues in that direction. Then, the general controller 211 monitors the increase and decrease of the AF evaluation value, and determines the zoom lens 301 has attained the focus position when the AF evaluation value attains a maximum, and stops the movement of the lens. Such an AF method is an contrast method.

In the digital camera 1 of the present embodiment, AF is executed by the aforesaid method, but when the image data have low luminance due to a dark photographic environment, the main photograph is taken with the built-in flash 5, i.e., photographic flash emission, but also the built-in flash 5, i.e., photographic flash emission is used during the AF process. The photographic flash and the AF flash use different emission amounts.

Figure 9A:
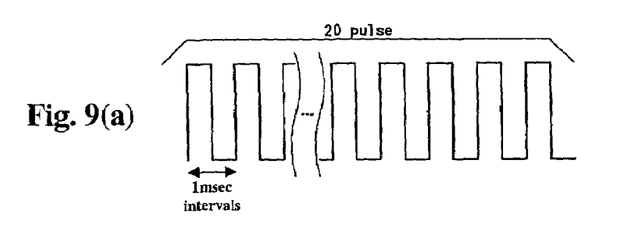
FIG. 9(a) shows the light pulse of the flash emission during AF.
Figure 9B:
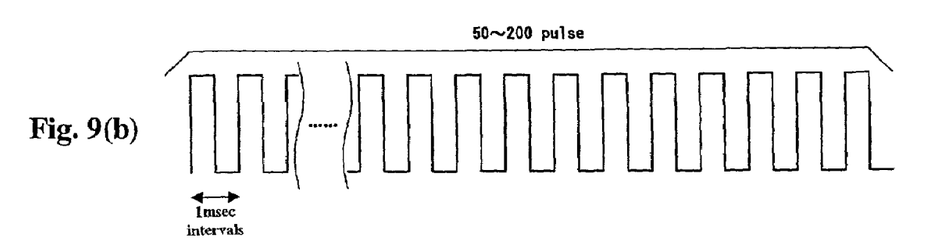
FIG. 9(b) shows the light pulse of the flash emission during photography.

FIG. 9 shows the emission pulse during AF flash emission in part (a), and the emission pulse during photographic flash emission in part (b). In the digital camera 1, the built-in flash 5 emits a pulse light when a pulse current is applied in 1 msec intervals. Then, the emission time and emission amount are controlled by the number of pulses of the pulse current. As shown in FIG. 9(a), 20 pulses of the current pulse are supplied during AF flash emission. In contrast, during photography flash emission as shown in FIG. 9(b), the pulse current is continuously applied until attaining the required emission amount in the range of 50 to 200 pulses while the reflected light is continuously detected by the light adjusting sensor 305 as previously described.

In the AF flash emission of the digital camera 1, luminance control is not executed (prohibited), and the amount of the AF flash emission is less than the amount of the photography flash emission.

Figure 10:
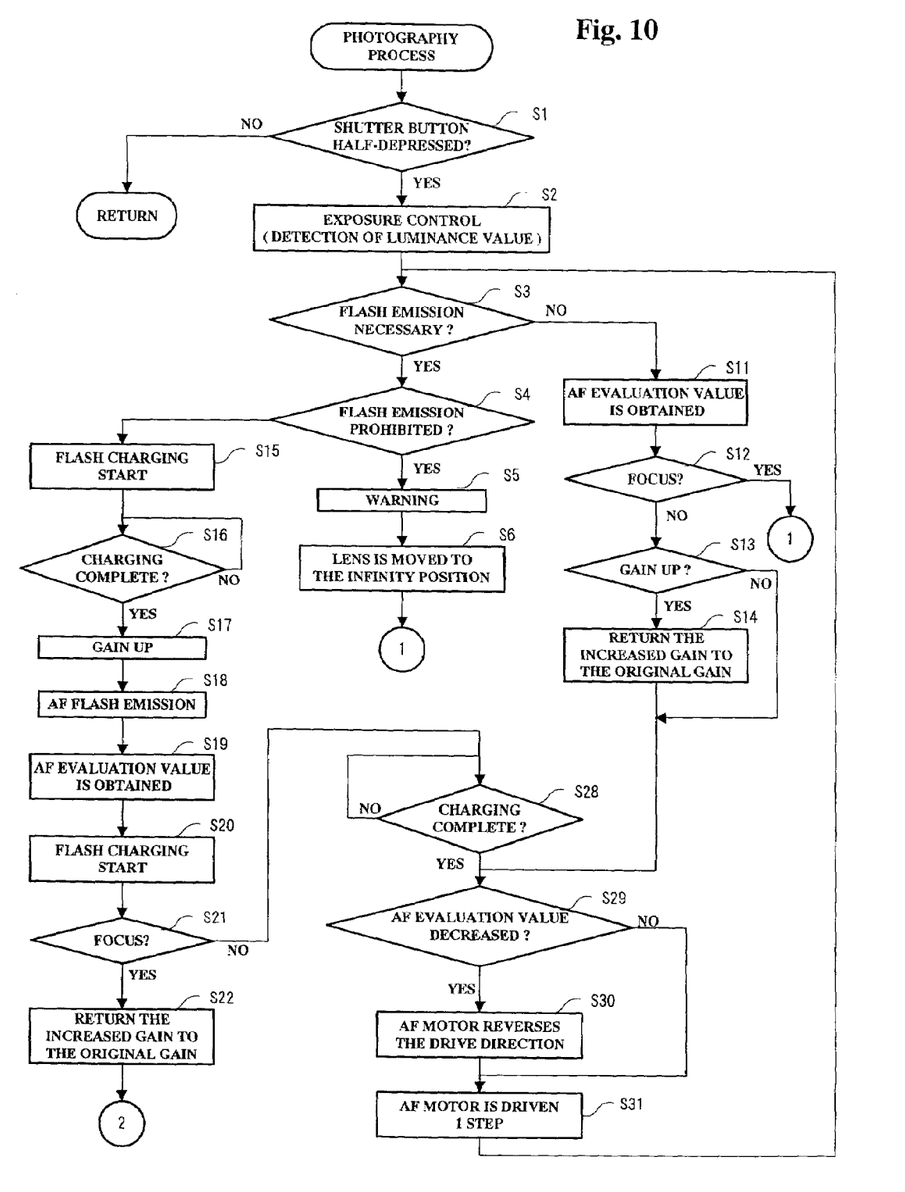
FIG. 10 is a flow chart showing the sequence of the photographic process in the digital camera of this embodiment.
Figure 11:
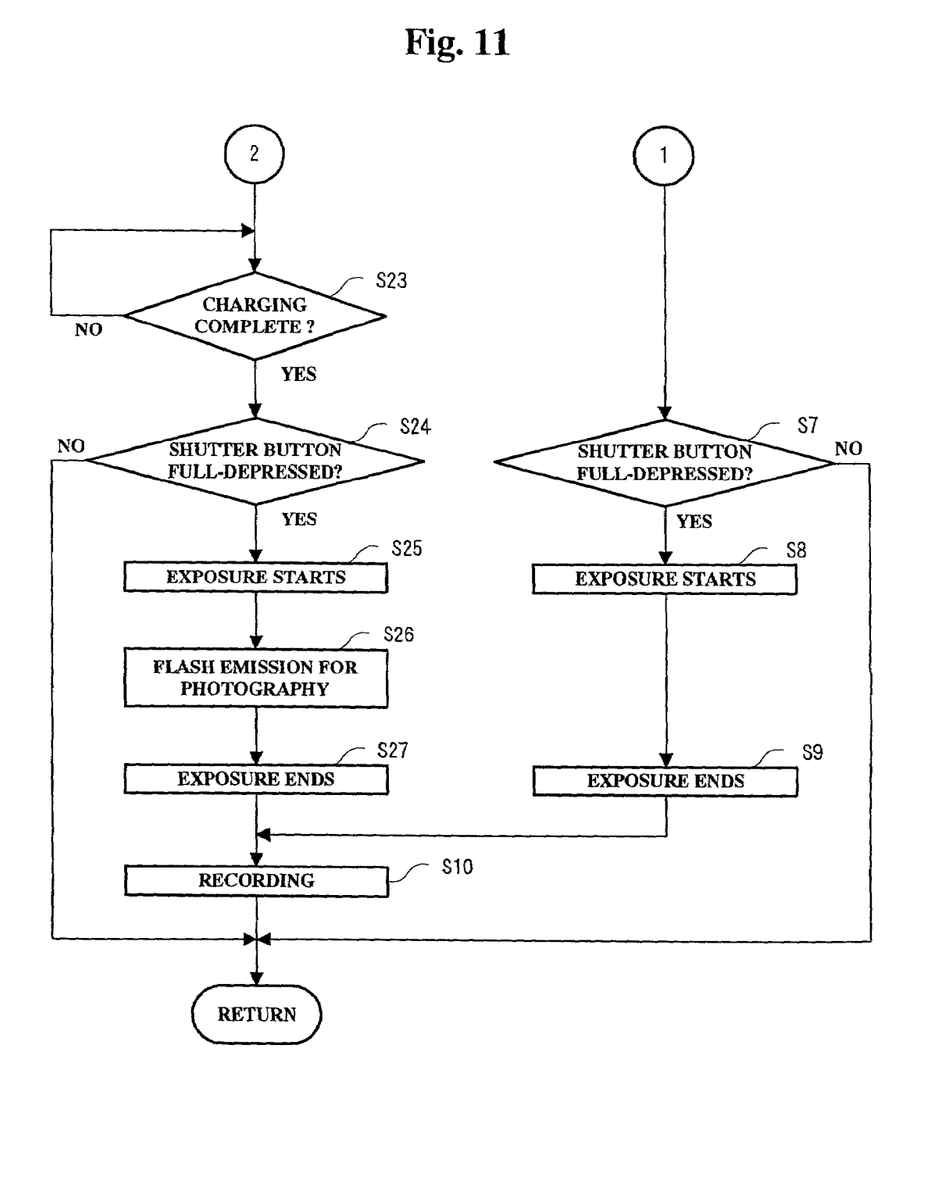
FIG. 11 is a flow chart showing the sequence of the photographic process in the digital camera of this embodiment.

The photography process in the digital camera 1 of the present embodiment is described below. FIGS. 10 and 11 are flow charts showing the photography process sequence. In the photography process, control of each part is executed by the general controller 211.

When the setting of the LCD button 321 is LCD display ON at the stage of entering the photography mode, a live view is displayed by the LCD 10. A user performs framing while viewing this display. Conversely, when the setting of the LCD button 321 is LCD display OFF, the LCD 10 is turned OFF. In this case, the user performs framing using the optical finder 31.

First, a check is made to determine whether or not the shutter button 8 is half-depressed (step S1 in FIG. 10). When the button 8 is not half-depressed, the photography process ends, whereas when the button 8 is half-depressed, the routine continues to the next step.

Next, the exposure control process is executed (step 2 in FIG. 10). In the previously described exposure control process, the general controller 211 detects the luminance value from the image data.

Then, a check is made to determine whether or not flash emission is necessary (step 3 in FIG. 10). When flash emission is unnecessary, the routine advances to step S11, whereas when flash emission is required the routine continues to the next step. Specifically, when the flash emission mode is the forced emission mode, the determination is that flash emission is required. However, when the flash emission mode is the automatic emission mode, the luminance value obtained in step 2 is extracted, and the determination is the flash mode is required when the luminance value is less than a specific threshold value.

Next, a determination is made as to whether or not the flash mode is the flash prohibition mode (step 4 in FIG. 10). When flash emission is not prohibited, the routine advances to step S15, whereas when flash emission is prohibited the routine continues to the next step. That is, in locations such as museums where flash photography is prohibited, neither photography flash nor AF flash emission can be used. Therefore, the user operates key switch 222 to set the flash mode to the emission prohibited mode. Through the setting of this mode, the general controller 211 thereafter controls the photography flash emission and the AF flash emission so as to prevent (prohibit) flash emission until the setting of the flash prohibition mode is cancelled.

Then, since flash emission is prohibited, sufficient luminance cannot be obtained for precise autofocusing. Therefore, a warning that AF is impossible is issued (step S5 in FIG. 10). Specifically, this warning is displayed on the LCD 10.

Next, the lens is moved to the infinity position (step S6 in FIG. 10). In this way even when AF cannot be executed, a photograph can be taken, and the user can focus manually.

Then, a determination is made as to whether or not the shutter button 8 is full-depressed (step S7 in FIG. 11). When the button 8 is not full-depressed, the photography process ends, whereas when the button 8 is full-depressed, the routine advances to the next step.

Then, exposure starts to obtain actual photographic image data (step S8 in FIG. 11). When exposure ends (step S9 in FIG. 11), the recording process is executed (step S10 in FIG. 11). Specifically, photographic image data are captured, and recorded to memory card 91 as desired by the user. Then, the photography process ends.

In step 3, when flash emission is unnecessary, i.e., when luminance is greater than a threshold value, the AF evaluation value is obtained (step S11 in FIG. 10).

Next, a determination is made as to whether or not the lens is focused (step S12 in FIG. 10). When the lens is focused, the processes of steps S7–S10, i.e., processes when the shutter button 8 is full-depressed, are executed. Conversely, when the lens is not focused, the routine advances to the next step.

Then, a determination is made as to whether or not a gain increase process described layer has been executed (step S13 in FIG. 10). When the gain increase process has not been executed, the routine advances to step S29. When the gain increase process has been executed, the gain is returned to the original value by the AGC circuit within the signal processing circuit 313 (step S14 in FIG. 10), and the routine advances to step S29. That is, 4 dB gain is reduced, and later photography is executed using the preset gain.

When the flash emission has not been prohibited in step S4, charging of the flash power condenser 213 starts (step S15 in FIG. 10), and a check is made to determined whether or not charging is complete (step S16 in FIG. 10); The determination of step S16 is repeated until charging is complete. When charging is complete, the routine advances to the next step. The amount of the recharge for AF flash emission is set so as to be less than for the photography flash emission.

Whether or not charging is complete is determined by the elapse of a previously determined recharge time.

Then, the gain up process is executed (step S17 in FIG. 10). Specifically, the 4 dB gain is increased by the AGC circuit within the signal processing circuit 313. In this way the amount of the AF flash emission is reduced in step S18.

Next, flash emission is executed for autofocusing by the built-in flash 5 (step S18 in FIG. 10), and the AF evaluation value is obtained (step S19 in FIG. 10).

Thereafter, flash charging starts (step S20 in FIG. 10). Then, a check is made to determine whether or not the lens has been focused in parallel with the flash charging (step S21 in FIG. 10). If the lens is not focused, the routine advances to step S28, whereas when the lens is focused, the routine continues to the next step. In this way the processing time can be shortened in the digital camera 1 by performing the flash charging and the focus evaluation in parallel.

The gain is then returned to the original value (step S22 in FIG. 10).

A check is made as to determine whether or not charging is complete (step S23 in FIG. 11). This check is repeated until charging is complete. This process is identical to the process of step S16.

Then a check is made to determine whether or not the shutter button 8 is full-depressed (step S24 in FIG. 11). If button 8 is not full-depressed, the photography process ends, whereas if the button 8 is full-depressed, the routine continues to the next step.

Then, exposure starts (step S25 in FIG. 11), and photography flash emission is executed for main photography (step S26 in FIG. 11), and the exposure process ends (step S27 in FIG. 11). Then the recording process is executed (step S10 in FIG. 11), and the photography process ends.

When the lens is not focused in step S21, a check is made to determine whether or not flash charging is complete (step S28 in FIG. 10), and this check is repeated until charging is complete. This process is identical to the process of step S16. The drive of the AF motor 308 is controlled in step S31 described later so as to not be actuated during charging by waiting for charging to be completed in this step.

When charging is complete, a determination is made as to whether or not the AF evaluation value has decreased (step S29 in FIG. 10). If the AF evaluation value has not decreased, the routine advances to step S31. If the AF evaluation value has decreased, the AF motor 308 reverses the drive direction of the zoom lens 301 in the opposite direction (step S30 in FIG. 10), and the routine continues to the next step.

Then, the AF motor 308 is driven 1 step (step S31 in FIG. 10), and the routine returns to step S3, and the processes of step S3 and subsequent steps are repeated. When the flash emission is not prohibited and there is low luminance, the focus determination (step S21) is repeated while the AF flash emission (step S18) is executed, and after focus is attained, the recording process is executed (step S10) in accordance with the full depression of the shutter button 8. When the object becomes brighter during repeated AF and the luminance becomes excessive, the AF flash emission and photography flash emission are not executed.

When the photography process ends, the next photography process is entered, or the reproduction mode is set to regenerate a recorded image as desired by the user.

In the embodiments described above, the emission of the built-in flash 5 is controlled when luminance is less than a specific luminance value during the execution of the autofocus operation. Therefore, a light projection unit other than the built-in flash 5 is unnecessary for autofocusing. As a result, manufacturing costs are restrained, and flash emission can be controlled with the flash emission for photography in mind. Furthermore, focus precision is excellent even in low luminance without providing a distance measuring element like a silver halide camera.

Since the lens is not moved during charging by the flash power condenser 213, power depletion by performing flash charging and motor driving simultaneously is prevented.

When the general controller 211 determines the lens is not focused, the processing time can be shortened and power consumption prevented by executing the autofocus again insofar as the lens is not focused.

The luminance is again detected when executing autofocus again, and the built-in flash 5 emits light when the obtain luminance is less than a specific luminance threshold. That is, when autofocus is executed again, the built-in flash 5 is used only when there is low luminance, thereby preventing power consumption by needless flash emission.

The amount of the emission of the built-in flash 5 during autofocusing, is less than the amount of emission of the built-in flash 5 during photography, thereby preventing power consumption and shortening the processing time.

Since the gain is increased during autofocusing, the amount of emission of the built-in flash 5 can be reduced when autofocus is executed, and focus accuracy is improved because the focus is accurately evaluated.

When main photography is executed after the gain is increased, the gain is returned to the original value, so that the photographer can take the intended photograph in main photography wherein autofocus is executed in conjunction with emission by the built-in flash 5.

When the key switch 222 is set to prohibit flash emission, flash emission is not executed during autofocusing, such that the flash emission for autofocusing can be prevented in location prohibiting the use of a flash.

When the emission of the built-in flash 5 is prohibited during autofocusing, a warning is issued to the effect that autofocus is impossible, and the user can focus manually.

When the emission of the flash 5 may be prohibited during autofocusing and when the luminance is less than a specific threshold value, since the lens is moved to the infinity position, photography is possible immediately even when autofocus is impossible.

Since the focus determination is made based on the AF evaluation value in parallel with the charging of the flash power condenser 213, the processing time is shorter compared to when the focus determination is made after the complete recharge of the flash power condenser 213.

Since the amount of emission by the built-in flash 5 is not adjusted by the luminance control sensor 305 and luminance control circuit 304 during emission by the built-in flash 5 during autofocus, the luminance control time part of the processing time is shorter compared to when luminance control is performed during flash emission during autofocus.

3. Modifications

Although the digital camera has been described by way of examples in the aforesaid embodiments, the present invention is not limited to these examples.

For example, although the flash recharge completion is determined by time in the above embodiments, a voltage monitor may be provided to detect the voltage of the condenser (not illustrated) which supplies power to the flash, such that the recharge completion may also be determined by detecting the voltage value of the voltage monitor when recharge is complete.

Although the present invention has been fully described by way of examples with reference to the accompanying drawings, it is to be noted that various changes and modification will be apparent to those skilled in the art. Therefore, unless otherwise such changes and modifications depart from the scope of the present invention, they should be construed as being included therein.

What is claimed is:

1. A digital camera comprising:
an image sensing element for generating image data of an object;
a light emission device for emitting light to illuminate the object during photography;
a first detector for detecting contrast of the image data;
a focus evaluator for evaluating focus of a lens based on the detected contrast;
a lens driver for driving the lens based on the contrast detected by the first detector in response to the focus evaluation;
a second detector for detecting luminance of the image data;
a light emission controller for executing the light emission of the light emission device to detect the contrast when the luminance detected by the second detector is less than a specific value;
a power source for supplying an electrical power to the light emission device, the power source being chargeable, wherein a determination of whether the detected contrast is a maximum value is made in parallel with charging the power source; and
a lens drive controller for inhibiting the driving of the lens by the lens driver during charging of the power source.

2. The digital camera according to claim 1, further comprising a discriminator for discriminating whether or not the lens is focused based on the contrast obtained by the first detector during light emission of the light emission device, and the lens driving drives the lens repeatedly when the lens is not focused.

3. The digital camera according to claim 2, wherein when the lens driving is again executed, the light emission controller for executing the light emission of the light emission device when the luminance detected by the second detector is less than a specific value.

4. The digital camera according to claim 1, wherein the light emission controller controls an amount of light emission for detecting the contrast so as to be less than the light emission during photography.

5. A digital camera comprising:
an image sensing element for generating image data of an object;
a light emission device for emitting light to illuminate the object during photography;
a first detector for detecting contrast of the image data;
a focus evaluator for evaluating a focus condition based on the detected contrast;
a lens driver for driving a lens based on the contrast detected by the first detector responsive to a focus evaluation;
a second detector for detecting luminance of the image data;
a setter for setting prohibition of the light emission by the light emission device; and
a light emission controller for prohibiting the light emission during detection of the contrast when prohibition of flash emission has been set by the setter, and for executing the light emission of the light emission device to detect the contrast when the luminance detected by the second detector is less than a specific value and when the prohibition of flash emission has not been set,
wherein a determination of whether the detected contrast is at a maximum value is performed while charging the light emission device.

6. The digital camera according to claim 5, further comprising an indicator for alerting that the lens driving based on the detected contrast is impossible when the detected luminance is less than a specified value and the light emission is prohibited.

7. The digital camera according to claim 6, wherein the lens driver moves the lens to a specific position when the lens driving based on the detected contrast is impossible.

8. A digital camera comprising:
an image sensing element for generating image data of an object;
a light emission device for emitting light to illuminate the object during photography;
a first detector for detecting contrast of the image data;
a lens driver for driving a lens based on the contrast detected by the first detector;
a second detector for detecting luminance of the image data;
a light emission controller for executing the light emission of the light emission device to detect the contrast when the luminance detected by the second detector is less than a specific value;
a power source for supplying an electrical power to the light emission device and being chargeable; and
a discriminator for discriminating whether or not the detected contrast is a maximum value based on the contrast obtained by the first detector in parallel with the charging of the power source.

* * * * *